Dec. 18, 1923.
A. F. NELSON
1,478,245
DUST CAP FOR PNEUMATIC TIRE VALVES
Filed March 7, 1922   2 Sheets-Sheet 1
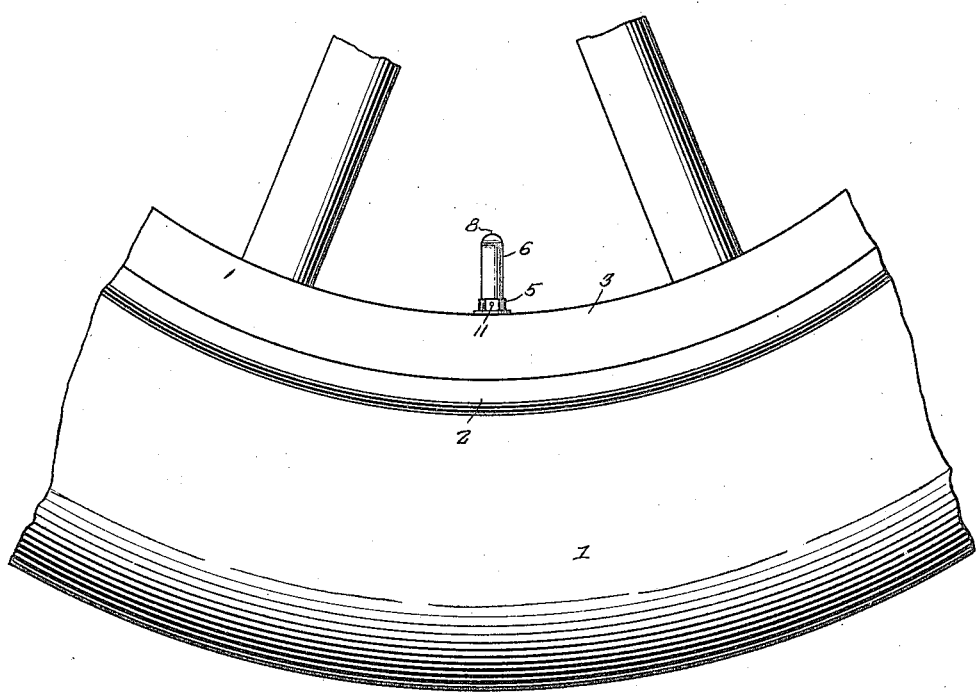
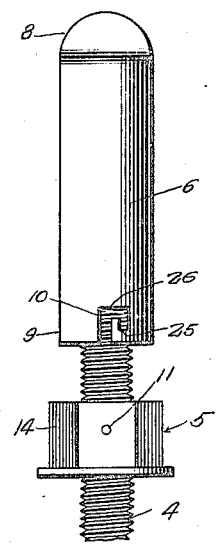
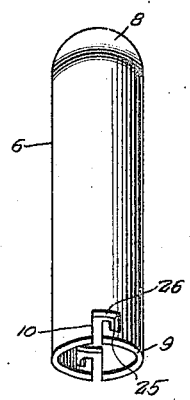
Inventor
A. F. Nelson,
By
Attorney

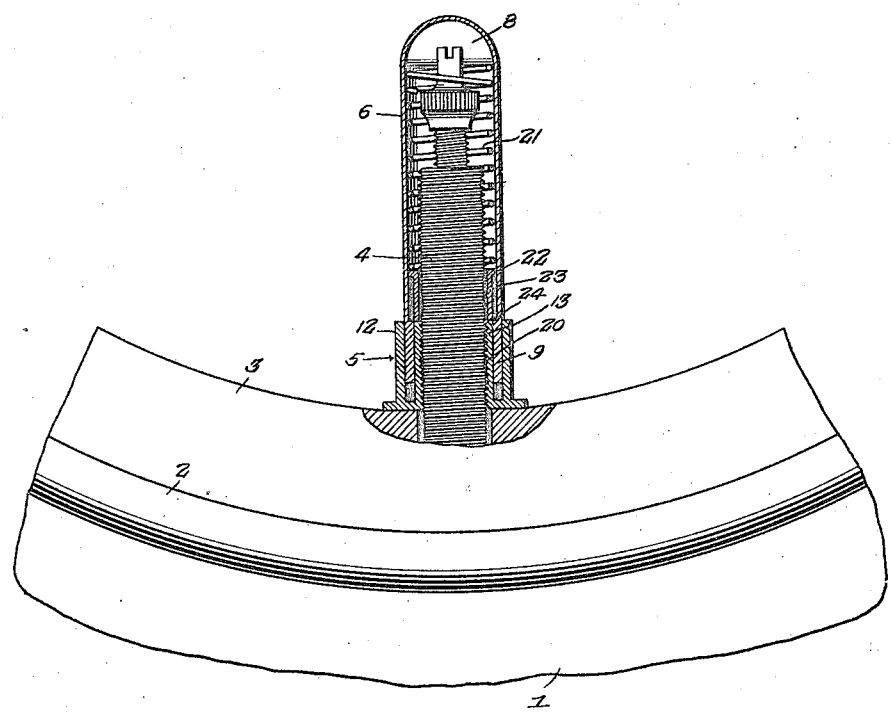
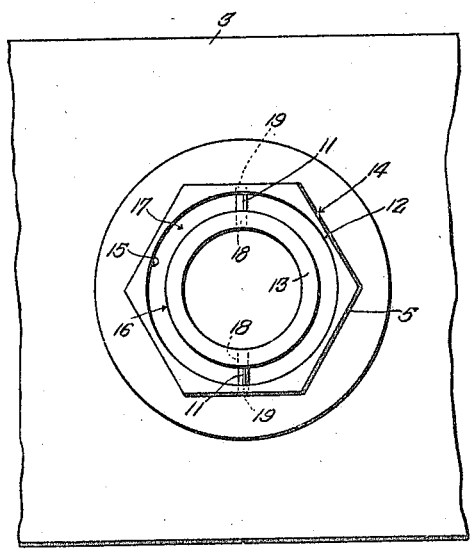
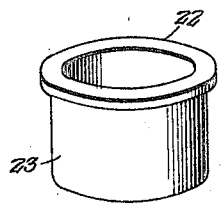

Patented Dec. 18, 1923.

1,478,245

UNITED STATES PATENT OFFICE.

AARON F. NELSON, OF HOLLIDAYSBURG, PENNSYLVANIA.

DUST CAP FOR PNEUMATIC-TIRE VALVES.

Application filed March 7, 1922. Serial No. 541,709.

*To all whom it may concern:*

Be it known that I, AARON F. NELSON, a citizen of the United States, residing at Hollidaysburg, in the county of Blair and State of Pennsylvania, have invented certain new and useful Improvements in Dust Caps for Pneumatic-Tire Valves, of which the following is a specification.

This invention relates to new and useful improvements in dust caps for pneumatic tire valves.

The primary objects of my invention are, first, to provide a dust cap for the valve stem that may be instantly removed or replaced without the necessity of first unscrewing and then screwing the same in position when it is necessary to inflate the tire; second, to provide a valve stem cap that may be removed or replaced with the jamb nut when it is necessary to remove the tire from the wheel in order to repair a puncture or blow-out; and third, to provide a special novel construction of jamb nut which will protect the inner valve stem from injury due to vibration.

With the foregoing and other objects in view that will appear as the nature of my invention is better understood, the same consists in the novel features of construction, combination and arrangement of parts illustrated in the drawings and more particularly pointed out in the appended claim.

In the accompanying drawings, which are for illustrative purposes only and are therefore not drawn to scale:—

Figure 1, is a fragmentary side elevation of a pneumatic tire and rim, illustrating the application of my invention.

Figure 2 is a view similar to Figure 1, showing the dust-cap, jamb nut and associated parts in section.

Figure 3 is a detail elevation of the dust cap and jamb nut and a section of the valve stem, showing the extended position of the dust cap or before its connection with the jamb nut.

Figure 4 is a detail perspective view of the dust cap.

Figure 5 is a detail fragmentary plan view of the jamb nut and a section of the rim, and Figure 6 a detail perspective view of the bearing sleeve for the inner end of the coil spring.

Referring to the drawings for a more particular description of my invention and in which drawings like parts are designated by like reference characters throughout the several views, the numeral 1 represents the tire casing, 2 the wheel rim, 3 the felloe, 4 the valve stem, 5 the jamb nut which screws on the valve stem against the inner surface or perimeter of the wheel felloe and 6 my improved dust cap.

The wheel rim and felloe as well as the valve stem are of any ordinary or approved construction, and hence, no further explanation of these parts is required. As shown, the valve stem cap is of hollow cylindrical elongated form with a closed rounded outer end 8 and an open inner end 9. In carrying out my invention, the inner end of this cap is formed at diametrically opposite points with bayonet slots 10 adapted to register with and receive a pair of cross pins 11 carried by the jamb nut. The jamb nut comprises the outer and inner spaced walls 12 and 13, respectively. The outer wall 12 is formed with a hexagonal outer surface 14 and a smooth cylindrical inner surface 15 and the inner wall 13 of the jamb nut with a smooth circular outer surface 16, leaving an annular space 17 between these walls 12 and 13 to receive the thickened inner end of the dust cap and across which annular space the cross pins 11 extend. The inner and outer ends 18 and 19 of the cross pins 11 extend into the walls 12 and 13 of the jamb nut and are therefore not exposed. The inner wall 13 of the jamb nut is interiorly threaded, as at 20, for screw threaded engagement with the valve stem.

A coil or helical spring 21 is arranged within the dust cap and surrounds the valve stem with its inner end seating on an annular outwardly extending flange 22 formed at the inner end of the cylindrical bearing sleeve 23 which is disposed in the inner end of the dust cap and is adapted to surround the valve stem. This flange 22 not only performs the above function but is adapted to engage a shoulder 24 formed by the thickened inner end of the dust cap and limits the extended position of the sleeve 23 under the action of the coil spring.

In practice, the dust cap is applied by depressing the same against the action of the coil spring 21 and subsequently turning it a fraction of a revolution to engage the cross pins 11 with the recesses 25 formed in the outer walls of the transverse portions 26 of the bayonet slots, which engagement will be maintained by the coil spring after the pressure applied on the cap is removed. During this operation, of applying the dust cap, the coil spring is compressed and the bearing sleeve caused to recede in the cap and assume the position shown in Figure 2 of the drawings, as will be apparent. When it is desired to inflate the tire, the dust cap may be instantly removed by first depressing it slightly to disengage the recesses 25 with the cross pins 11 and turning it slightly to bring the longitudinal portions of the bayonet slots into registration with said cross pins.

It is also pointed out that when it is necessary to remove the tire to repair a puncture or blow-out, the cap and jamb nut may be removed together or as a single unit, by simply unscrewing the latter, whereas, with the type of valve stem cap now in use, it is necessary to resort to the tedious and longer operation of first unscrewing and then screwing on the valve stem cap, in inflating the tire, and to first unscrew the cap and then the jamb nut when it is necessary to remove the tire from the wheel in order to make repairs.

By reference to Figure 2 of the drawings it will be seen that the thickened portion 9 of the cap fits snugly in the groove 17 and completely bridges the space between the opposite side walls of the groove. Therefore dust is prevented from entering the groove. The thickened portion 9 terminates at its upper end in an interiorly located annular shoulder which is located in the path of movement of the flange 22 upon the upper end of the sleeve 23. The sleeve fits snugly in the thickened portion of the cap when it is extended into the same under the pressure of the spring and when the cap is removed from the nut 5 and the flange 22 bridges the space between the exterior surface of the sleeve and the inner surface of the thinner portion of the dust cap. Therefore the said flange bridges the space between the sleeve and the inner surface of the cap and prevents the accumulation of dust between the sleeve and the cap and, by reason of these dust excluding means, the dust is prevented from entering the nipple and the tire tube. The flange 22 in combination with the shoulder of the thickened portion of the cap limits the sliding movement of the sleeve and when the cap is removed from the nut the lower edge of the sleeve is spaced slightly from the lower end of the cap and hence space is provided for guiding the lower end of the cap into the groove of the nut when the cap is being applied.

My novel construction of jamb nut not only protects the rim of the wheel but holds the valve stem permanently in one position against vibration and thus safeguards the inner valve stem against injury.

From the foregoing description taken in connection with the drawings, it is thought that the construction, operation and advantages of my invention will be readily understood without requiring a more extended explanation.

Having described my invention, what I claim as new and desire to secure by Letters Patent, is:—

A valve protector comprising a nut having an annular groove with pins disposed across the groove, a tubular cap having a thickened end portion adapted to fit snugly in the groove of the nut and having slots adapted to receive the pins, the thickened portion of the cap terminating at its upper edge in an interiorly located annular shoulder, a sleeve fitting snugly and slidably in the thickened portion of the cap, the outer end of the sleeve adapted to bear against the intermediate portion of the face of the nut when the thickened portion of the cap is inserted in the annular groove, the sleeve being provided at its inner end with an outwardly disposed annular flange adapted to engage the shoulder of the thickened portion of the cap and limit the sliding movement of the sleeve in the cap, the cap being closed at its outer end and a coil spring interposed between the closed end of the cap and the flanged end of the sleeve and being under tension with a tendency to hold the flange of the sleeve toward the shoulder of the cap.

In testimony whereof I affix my signature.

AARON F. NELSON.